United States Patent
Noto et al.

(10) Patent No.: US 7,476,042 B2
(45) Date of Patent: Jan. 13, 2009

(54) IMAGE CAPTURE APPARATUS

(75) Inventors: Goro Noto, Ohta-ku (JP); Yoshitaka Hashimoto, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 463 days.

(21) Appl. No.: 11/234,639

(22) Filed: Sep. 22, 2005

(65) Prior Publication Data

US 2006/0078330 A1    Apr. 13, 2006

(30) Foreign Application Priority Data

Oct. 12, 2004    (JP)    ............................ 2004-297860

(51) Int. Cl.
*G03B 9/08*    (2006.01)
*G03B 9/40*    (2006.01)
(52) U.S. Cl. ...................................... 396/452; 396/487
(58) Field of Classification Search ............... 396/452, 396/457, 487; 348/294
See application file for complete search history.

(56) References Cited

U.S. PATENT DOCUMENTS

| 6,327,085 | B1 | 12/2001 | Osawa |
| 6,392,803 | B2 | 5/2002 | Osawa |
| 6,650,474 | B2 | 11/2003 | Osawa |
| 6,778,325 | B2 | 8/2004 | Osawa |
| 7,050,103 | B2 * | 5/2006 | Fushimi et al. ............. 348/340 |
| 2002/0149847 | A1 | 10/2002 | Osawa et al. |
| 2004/0042078 | A1 | 3/2004 | Osawa |

FOREIGN PATENT DOCUMENTS

| JP | 5-107403 A | 4/1993 |
| JP | 2000-29132 A | 1/2000 |
| JP | 2002-281362 A | 9/2002 |
| JP | 2003-37756 A | 2/2003 |

* cited by examiner

*Primary Examiner*—Rodney E Fuller
(74) *Attorney, Agent, or Firm*—Canon USA Inc IP Division

(57) ABSTRACT

In an image capture apparatus, the surface of an optical element and a shutter are made to have conductivity, and they are grounded so as to have the same potential, so that adhesion of foreign matter onto the surface of the optical element can be prevented.

5 Claims, 9 Drawing Sheets

FIG.8

| | | 901 THE NUMBER OF FINE PARTICLES | 902 THE NUMBER OF FINE PARTICLES ADHERING TO THE OPTICAL ELEMENT 11 AFTER SHUTTER OPERATION | 903 THE NUMBER OF ADHERENT FINE PARTICLES / THE NUMBER OF ORIGINAL FINE PARTICLES | 904 AVERAGE ADHESION RATE |
|---|---|---|---|---|---|
| 910 CONVENTIONAL CONFIGURATION | 1 | 588 | 162 | 0.276 | 0.221 |
| | 2 | 691 | 108 | 0.156 | |
| | 3 | 297 | 69 | 0.232 | |
| 911 ACCORDING TO FIRST EMBODIMENT | 1 | 594 | 8 | 0.013 | 0.046 |
| | 2 | 436 | 34 | 0.078 | |
| | 3 | 397 | 18 | 0.045 | |
| 912 ONLY OPTICAL ELEMENT 11 | 1 | 462 | 61 | 0.132 | 0.132 |

IMAGE CAPTURE APPARATUS

BACKGROUND OF THE INVENTION

1. Field of the Invention

The present invention relates to a technique of preventing foreign matter from adhering to the surface of an optical member arranged on or near a focal plane, such as a solid-state image sensor, an optical filter, or a lens, in an image capture apparatus.

2. Description of the Related Art

A digital camera takes an image by exposing a solid-state image sensor that converts light energy into electrical signals. In such a digital camera, unlike a film camera, an image is taken using a solid-state image sensor. Accordingly, if foreign matter happens to adhere to an optical element disposed in front of the solid-state image sensor, the foreign matter may remain unremoved, and a portion to which the foreign matter have adhered may be captured as shading in images that are taken thereafter. Possible causes of the occurrence of such foreign matter include the following, especially in an interchangeable lens-type single-lens reflex camera.

(A1) In a camera having a focal plane shutter, shutter blades of the focal plane shutter rub against each other when the shutter works, and paint on the shutter blade may be peeled off and may remain as foreign matter in the camera.

(A2) In an interchangeable lens-type camera, when a mount cap, which is used to protect a mount of the camera while an interchangeable lens is not attached to the camera, is attached to the mount, the mount cap may be scraped due to rubbing between the mount cap and the mount, and the scraped pieces of the mount cap may occur as foreign matter.

(A3) When interchangeable lenses are exchanged, some foreign matter may enter the inside of the camera from the outside.

In at least some of the causes of foreign matter remaining in the inside of the camera as discussed above, especially in the above causes (A1) and (A2), foreign matter that occurs inside the camera occurs due to exfoliation. Therefore, the foreign matter may be charged with electricity.

Further, possible causes of foreign matter adhering to an optical element include the following.

(B1) When an optical element is charged with electricity as discussed below, an electric field occurs between the optical element and the shutter blade, and electrostatic force works on the charged foreign matter. Therefore, the foreign matter is attracted towards the optical element and adheres thereto.

(B2) Due to airflow or vibration inside the camera, foreign matter adheres to the optical element.

Herein, the reasons for electrification of the optical element that leads to the above cause (B1) are discussed. The reasons for the electrification of the optical element include mainly two reasons as described below.

(C1) In a camera during photographing, when a main mirror is flipped up, a member supporting the main mirror comes into contact with a stopper portion on the top of a mirror box. Therefore, contact charging occurs. In addition, friction charging occurs by friction of the shutter blades in a shutter operation. By these causes, potential changes occur in the shutter blades. Therefore, electricity is induced to the optical element, which is then charged with electricity.

(C2) Crystal and lithium niobate used as a low-pass filter of the optical element are materials with pyroelectricity. Pyroelectricity is the electrical potential created in a particular crystal, in which when the crystal is polarized as a result of a change in temperature, or when a piezoelectric effect occurs due to deformation by temperature changes, the crystal material is charged with electricity. Therefore, when the pyroelectric low-pass filter is charged with electricity, the whole optical element is charged with electricity.

The reason (C1) among the reasons for such electrification of the optical element is also applicable to a solid-state image sensor located near a focal plane shutter in the case of a camera in which no optical element is disposed in front of the solid-state image sensor. Thus, the reason (C1) leads to adhesion of foreign matter onto the surface of the solid-state image sensor.

A method of preventing foreign matter from adhering to the surface of an optical element or a solid-state image sensor including a charged member disposed around an optical element is discussed in Japanese Patent Application Laid-Open No. 2003-37756. In this configuration, the charged member disposed around the optical element has a larger potential than that of the optical element. Therefore, charged foreign matter is attracted to the charged member and is, thus, prevented from adhering to the optical element. However, electric consumption increases due to driving of the charged member, and a space for the charged component is required. Therefore, a problem arises in that the camera size cannot be reduced.

In addition, a charging prevention process is discussed in Japanese Patent Application Laid-Open No. 5-307403, in which conductive fine particles are dispersed in a reflection reducing film on the surface of an optical element. In this process, a highly conductive layer is arranged in an optical element to thereby prevent electrification of the optical element, so that adhesion of foreign matter onto the optical element due to electricity can be prevented. However, in this configuration, a problem arises in that, since the refractive index of the film changes locally due to the conductive fine particles, the transmission factor decreases. Further, another problem arises in that incident light scatters at the film.

In addition, a conductive cover member that is disposed on the surface of a solid-state image sensor is discussed in Japanese Patent Application Laid-Open No. 2002-281362. In this configuration, the cover member disposed on the surface of the solid-state image sensor is in contact with the ground potential of a camera to thereby lower the potential of the solid-state image sensor, so that adhesion of foreign matter onto the solid-state image sensor by static electricity can be prevented. However, even in this configuration, if the focal plane shutter has a potential, a potential difference occurs between the solid-state image sensor and the focal plane shutter. Thus, an electric field occurs on the front surface of the solid-state image sensor. Therefore, a problem arises in that the electric field causes foreign matter to be attracted to the surface of the solid-state image sensor and to adhere thereto.

In addition, transparent electrodes that are disposed on the surface of a solid-state image sensor and the surface of an optical element are discussed in Japanese Patent Application Laid-Open No. 2000-29132. In this configuration, a voltage is applied to the transparent electrodes disposed on the surface of the solid-state image sensor and the surface of the optical element to thereby neutralize the electric charges occurring on the solid-state image sensor and the optical element into the same electrical potential. However, a problem arises in that the arrangement of the transparent electrodes decreases the amount of light transmission, and power consumption is required for applying a voltage.

SUMMARY OF THE INVENTION

The present invention has been made in consideration of the above problems and is directed to an image capture apparatus that is capable of preventing foreign matter from adhering to a surface facing an object side of an optical element, without causing any adverse optical effect.

In one aspect of the present invention, an image capture apparatus includes a shutter blade having electrical conductivity, and an optical element located behind the shutter blade as viewed from a lens unit, wherein an electrical potential of at least a surface facing an object side of the optical element is the same as an electrical potential of the shutter blade.

In another aspect of the present invention, an image capture apparatus includes a shutter blade having electrical conductivity, and an image sensor located behind the shutter blade as viewed from a lens unit, wherein an electrical potential of at least a surface facing an object side of the image sensor is the same as an electrical potential of the shutter blade.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram showing experimental results of reduced adhesion of dust onto an optical element according to the first embodiment.

DETAILED DESCRIPTION OF THE EMBODIMENTS

Embodiments of the invention will be described in detail below with reference to the drawings.

First Embodiment

Figure 1:
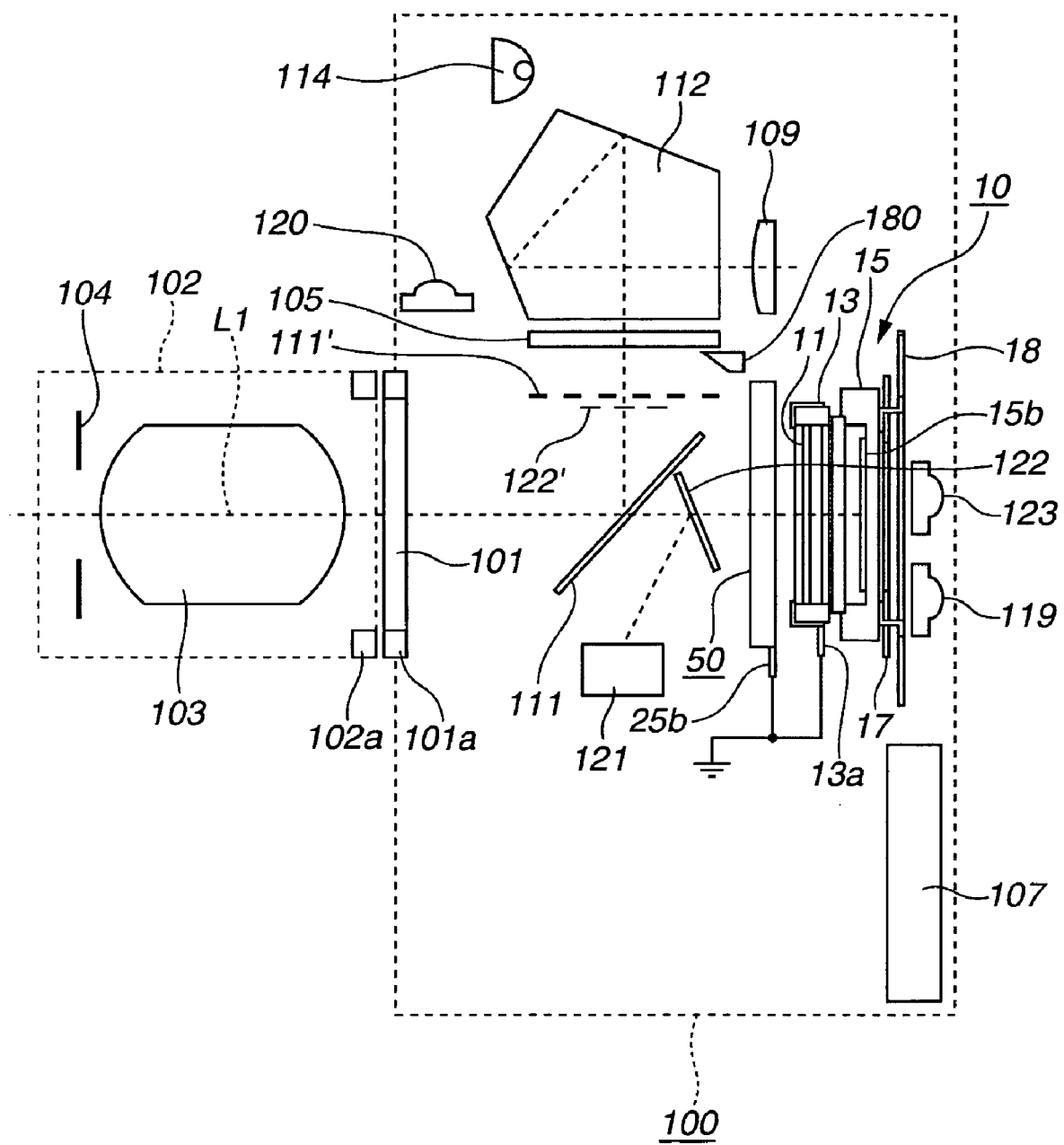
FIG. 1 is a schematic sectional view showing the structure of an interchangeable lens-type digital single-lens reflex camera system according to a first embodiment.

FIG. 1 is a schematic sectional view showing the structure of an interchangeable lens-type digital single-lens reflex camera system according to a first embodiment of the invention.

The camera system includes a camera body (image capture apparatus) 100 and a lens unit 102 that is removably attached to the camera body 100.

The camera body 100 is a single-sensor digital color camera using an image sensor such as a charge-coupled device (CCD) or a complementary metal-oxide semiconductor (CMOS) sensor or the like. The image sensor is driven on a continuous basis or on a one-shot basis to capture an image signal representing a moving image or a still image. In the present embodiment, the image sensor is an area sensor of the type that converts exposing light into an electrical signal for each pixel, accumulates an electric charge corresponding to the amount of received light, and reads out the accumulated electric charge.

In FIG. 1, the camera body 100 has a mount mechanism 101 used to removably connect the lens unit 102 (interchangeable lens unit) to the camera body 100. Thus, the lens unit 102 is connected electrically and mechanically to the camera body 100 via the mount mechanism 101. If some interchangeable lens units 102 of different focal lengths are selectively mounted on the camera body 100, image frames of various angles of view can be obtained.

In an optical path L1 leading from a photographing optical system 103 of the lens unit 102 to a solid-state image sensor 15, an optical element 11 is disposed that controls the cutoff frequency of the photographing optical system 103 so that unnecessarily high spatial frequency components of an object image (optical image) should not be transmitted to the solid-state image sensor 15.

A signal that is read from the solid-state image sensor 15 is subjected to a predetermined process as described later herein, and is then displayed as image data on a display unit 107. The display unit 107 is attached to the rear side of the camera body 100. A user can directly observe an image displayed on the display unit 107. If the display unit 107 is constructed from an organic electroluminescence (EL) spatial modulation element, a liquid crystal spatial modulation element, a spatial modulation element using electrophoresis of fine particles, or the like, electricity consumption can be reduced, and the thickness of the display unit 107 can be reduced. Accordingly, the camera body 100 can attain energy saving and reduction in size.

The solid-state image sensor 15 is, for example, a CMOS process compatible sensor (hereinafter referred to simply as the "CMOS sensor") as one of a number of amplification type solid-state image sensors. One of the features of the CMOS sensor is that since a MOS transistor of an area sensor unit and peripheral circuits such as an image sensor driving circuit, an A/D converting circuit, and an image processing circuit can be formed in the same process, the number of masks and the number of processes can be reduced greatly in comparison with a CCD. In addition, random access is available to an arbitrary pixel, thinning-out reading for display is easy, and display can be made on the display unit 107 at a high display rate in real time. The solid-state image sensor 15, using the above features, performs display image output operations (reading from an area where part of the light receiving area of the solid-state image sensor 15 is thinned out) and high-definition image output operations (reading from the entire light receiving area).

A movable half mirror 111 reflects part of light beams from the photographing optical system 103 and transmits the remaining part of light beams. The refractive index of the half mirror 111 is approximately 1.5, and the thickness thereof is 0.5 mm. A focusing screen 105 is disposed on the prescribed imaging plane for an object image formed by the photographing optical system 103. A pentagonal prism 112 is located above the focusing screen 105. A finder lens 109 is a lens used to observe an object image formed on the focusing screen 105, and is constructed from a single or a plurality of finder lens elements. The focusing screen 105, the pentagonal prism 112, and the finder lens 109 constitute a finder optical system.

Behind (at the image plane side of) the half mirror 111, a movable sub mirror 122 is arranged. The sub mirror 122 reflects light beams that are close to the optical axis L1 among the light beams that have passed through the half mirror 111, and guides them to a focus detecting unit 121. The sub mirror 122 rotates around a rotation axis arranged on a supporting member (not shown) of the half mirror 111, and moves in conjunction with the movement of the half mirror 111. The focus detecting unit 121 receives the light beams from the sub mirror 122 and detects a focus according to a phase difference detection method. An optical path splitting system that is composed of the half mirror 111 and the sub mirror 122 can take a first optical path splitting status for guiding light beams to the finder optical system, and a second optical path splitting status for guiding light beams from an imaging lens (not shown) directly to the solid-state image sensor 15. In the second optical path splitting status, the optical path splitting system recedes from the photographic optical path to the positions 111' and 122' shown by dotted lines in FIG. 1.

A movable flashing unit 114 can move between a retracted position in which it is stored in the camera body 100 and a flashing position in which it protrudes from the camera body 100. A focal plane shutter 50 is operative to adjust the amount of light falling on the imaging plane. A main switch 119 is operable to start the operation of the camera body 100.

Reference numeral 120 indicates a release button that is pressed down in two steps, and at its half pressed position, photograph preparation operations (light measuring operation, focus adjusting operation, and the like) are started, and at its fully pressed position, photograph operations (recording of image data read from the solid-state image sensor 15 on a recording medium) are started. Reference numeral 123 indicates a mode change switch for switching to a cleaning mode for removing dust or dirt adhering to the surface of the optical element 11 of the camera body 100. Reference numeral 180 indicates an in-finder information display unit for displaying predetermined information on the focusing screen 105. When the mode change switch 123 is operated, the half mirror 111 and sub mirror 122 move to the second optical path splitting status positions 111' and 122', respectively, and the focal plane shutter 50 is brought into a fully open status. This is referred to as a "cleaning mode". In the cleaning mode, the user can observe the surface of the optical element 11 directly from the opening of the mount mechanism 101, and in this condition, the user can remove dust and dirt adhering to the surface of the optical element 11 by use of a cleaning accessory kit, a known cleaning kit, or the like.

Next, the structure of the focal plane shutter 50 and an image capture unit 10 is described in detail with reference to FIGS. 2 to 6.

Figure 2:
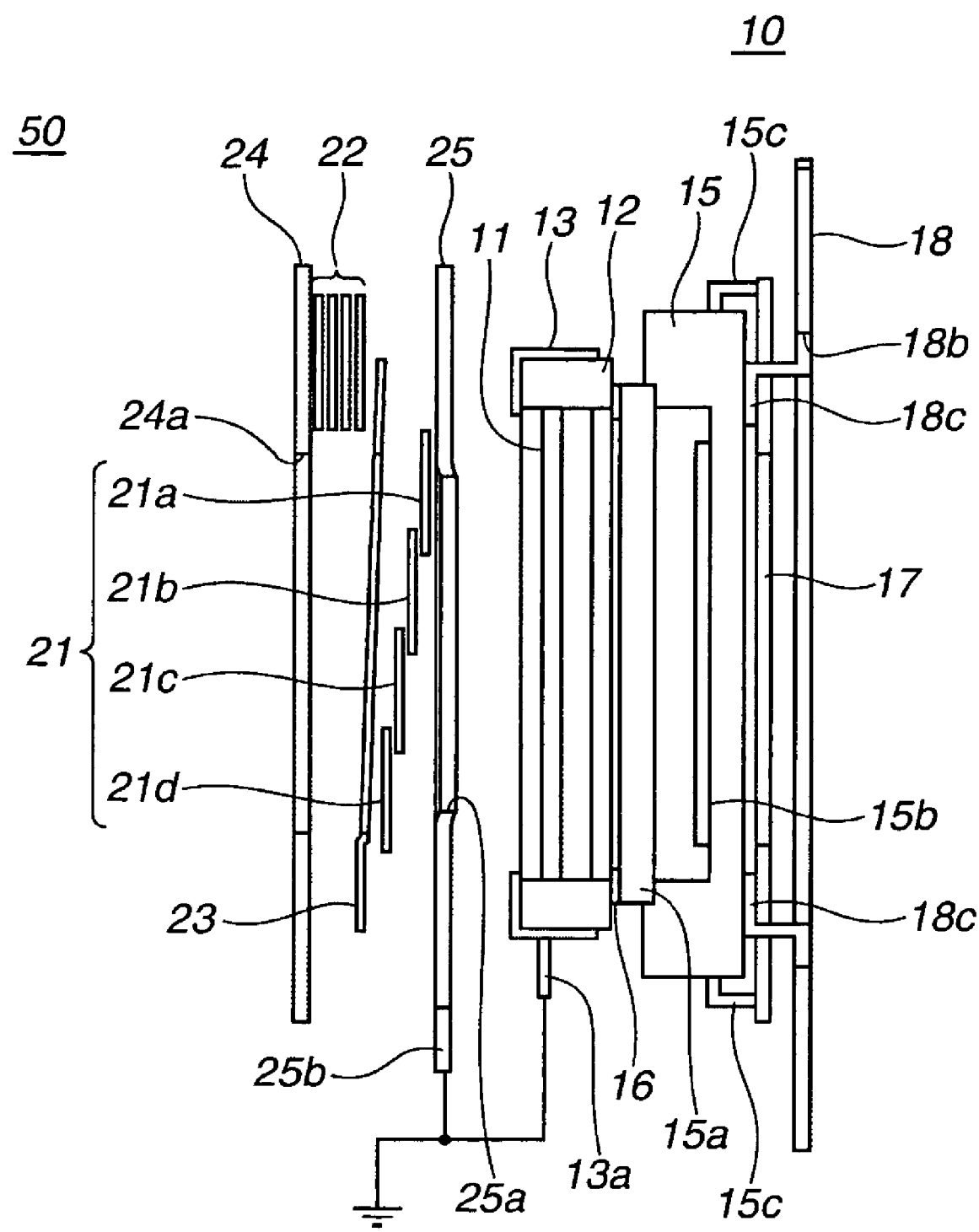
FIG. 2 is a cross sectional side view illustrating the outline structure of an image capture unit and a focal plane shutter according to the first embodiment.
Figure 3:
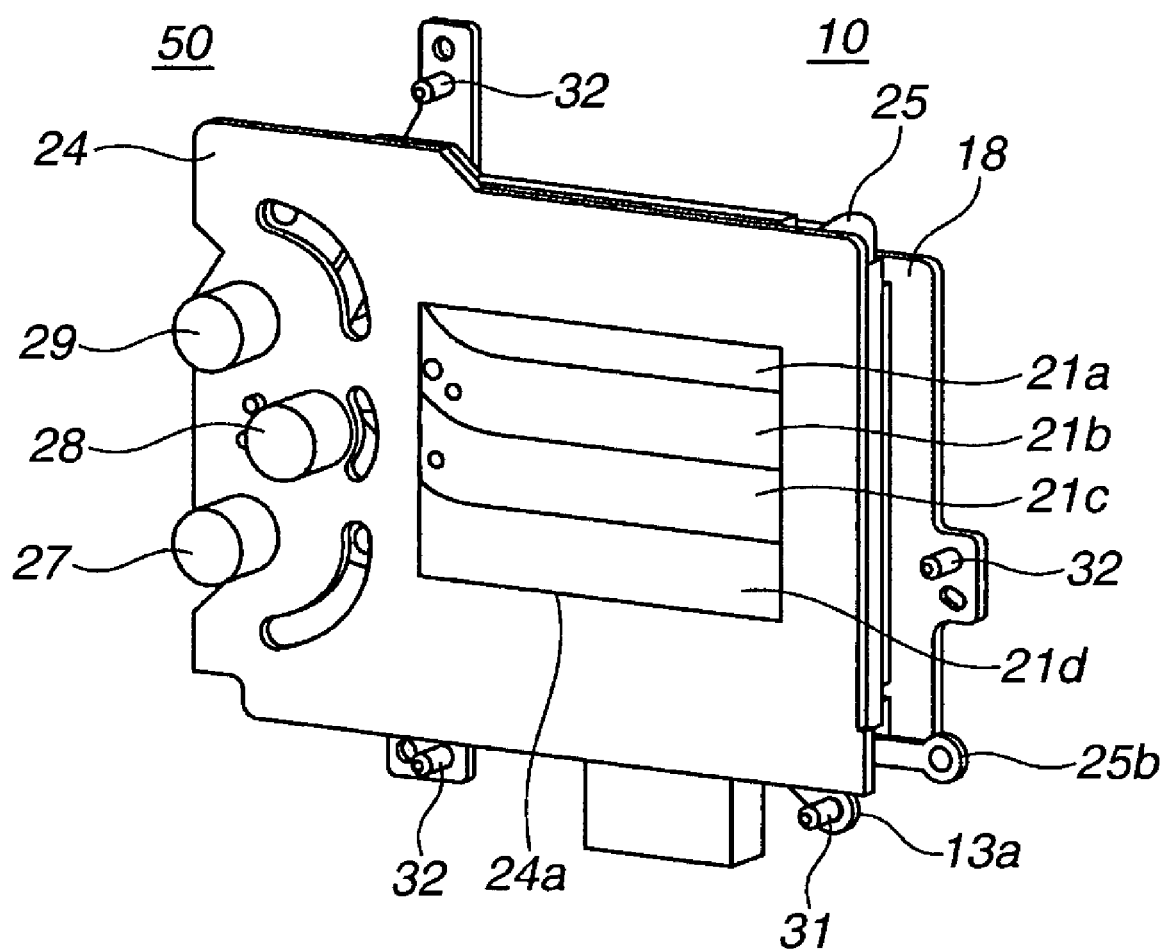
FIG. 3 is front perspective view showing the image capture unit and the focal plane shutter according to the first embodiment.
Figure 4:
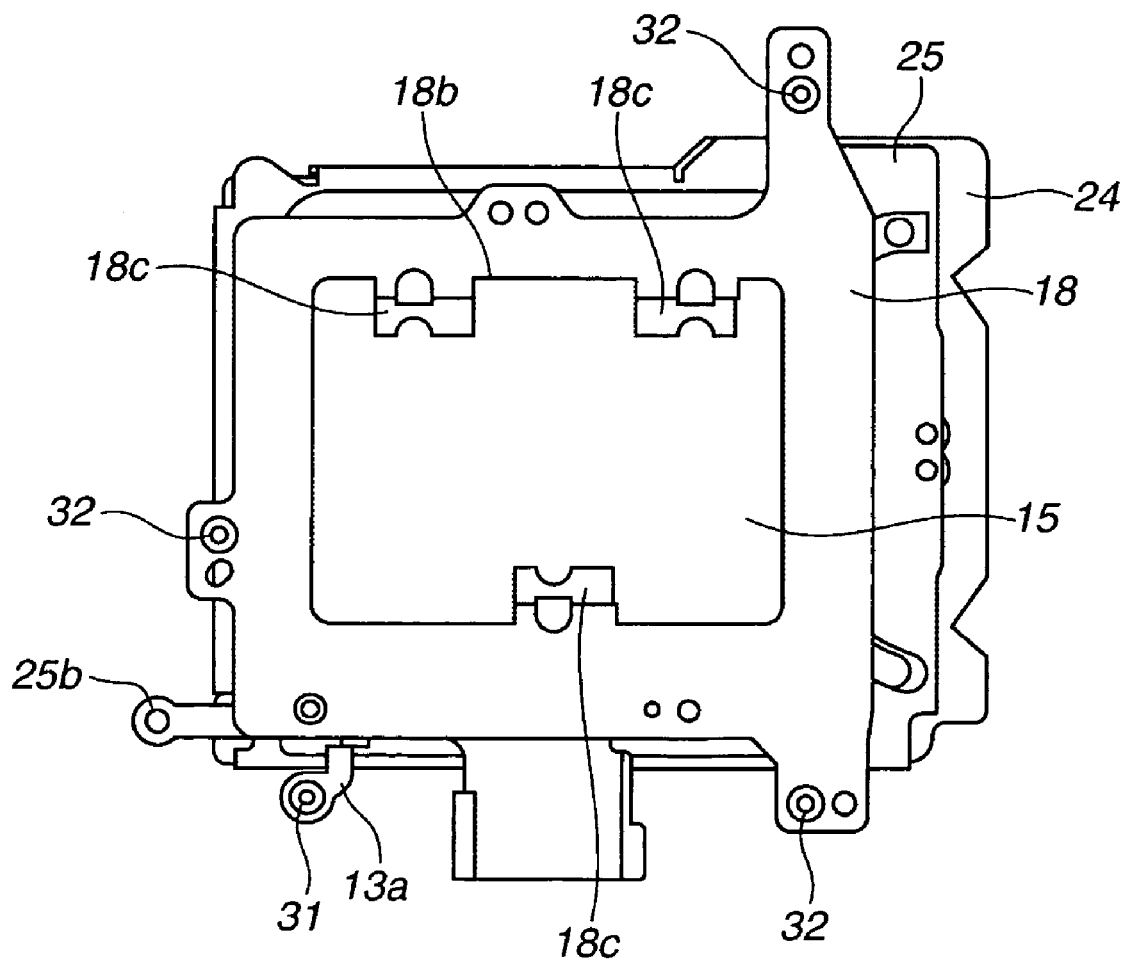
FIG. 4 is a rear perspective view showing the image capture unit and the focal plane shutter according to the first embodiment.
Figure 5:
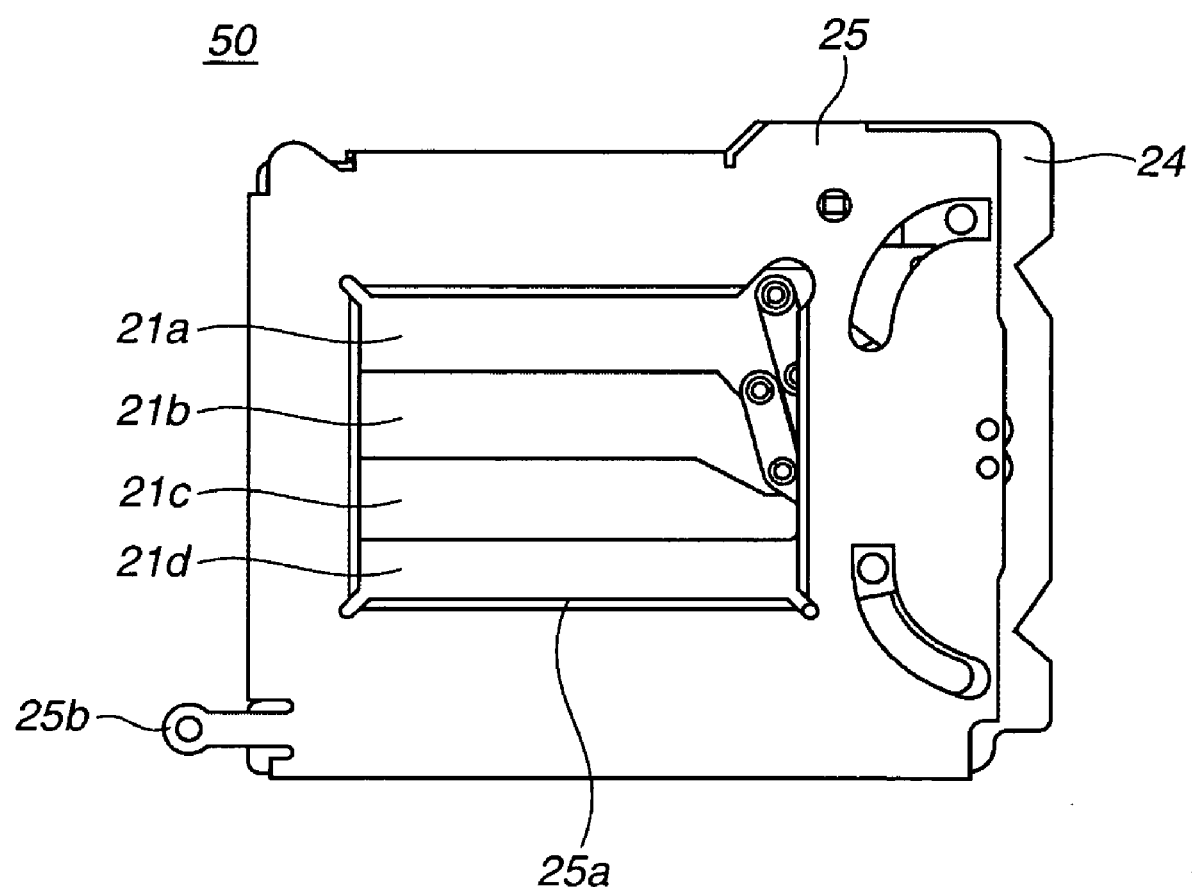
FIG. 5 is a rear perspective view showing the focal plane shutter according to the first embodiment.
Figure 6:
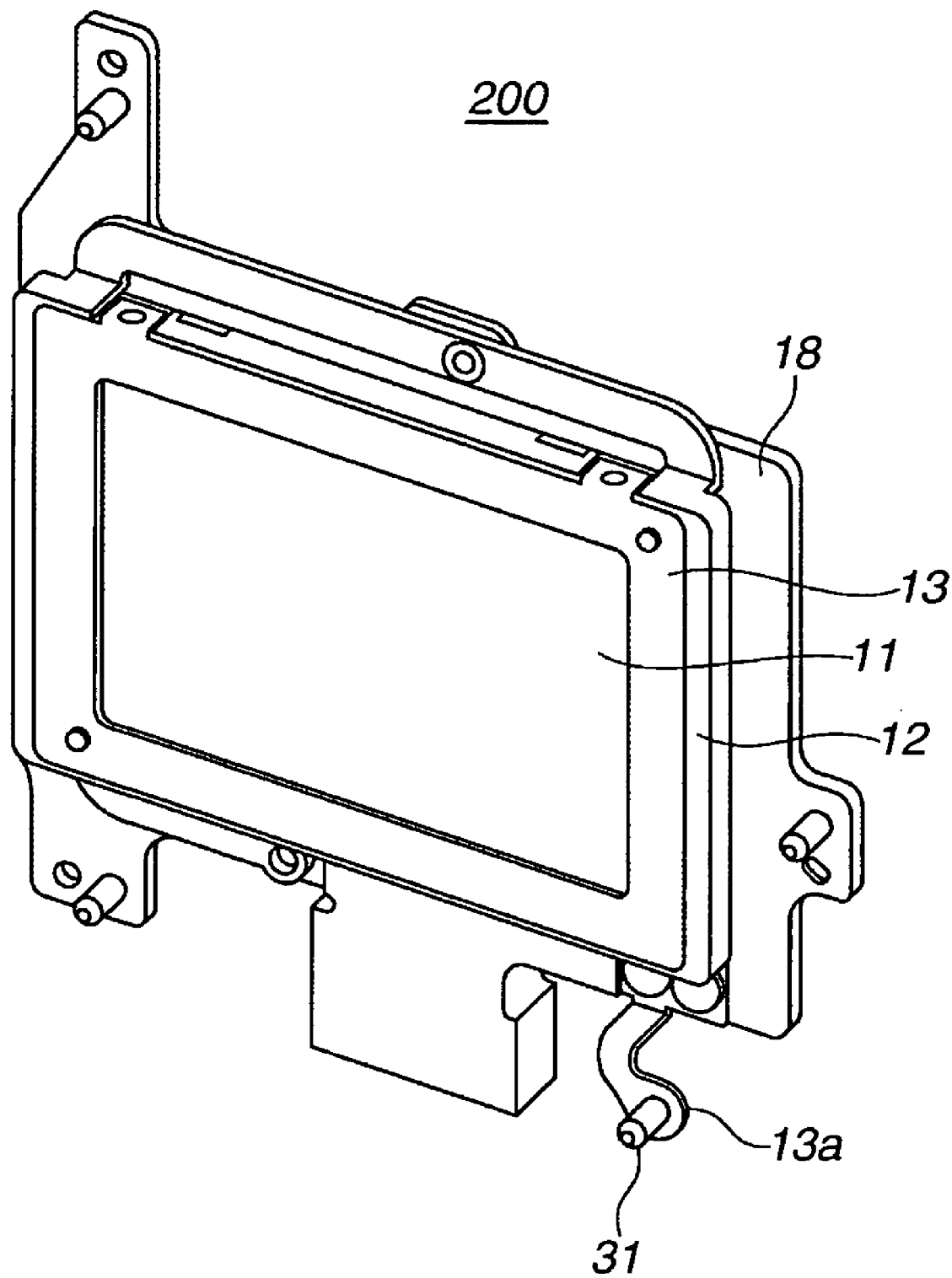
FIG. 6 is a front perspective view showing the image capture unit according to the first embodiment.

FIG. 2 is a cross sectional side view illustrating the outline structure of the image capture unit 10 and the focal plane shutter 50 of the digital camera according to the first embodiment. FIG. 3 is front perspective view showing the image capture unit 10 and the focal plane shutter 50 (perspective view as viewed from the focal plane shutter 50 side). FIG. 4 is a rear perspective view showing the image capture unit 10 and the focal plane shutter 50. FIG. 5 is a rear perspective view showing the focal plane shutter 50 (perspective view as viewed from the image capture unit 10 side). FIG. 6 is a front perspective view showing the image capture unit 10 (perspective view as viewed from the focal plane shutter 50 side).

In FIGS. 2 to 6, the image capture unit 10 mainly includes the optical element 11, a supporting member 12, a conductive member 13, the solid-state image sensor 15, a sealing member 16, a circuit board 17, and a supporting plate 18. The supporting member 12 supports the optical element 11. The conductive member 13 is made of a conductive material and is configured to fix the optical element 11 and the supporting member 12 integrally. The solid-state image sensor 15 includes an image sensor element 15b, a cover member 15a that protects the image sensor element 15b, and a connection terminal 15c. The sealing member 16 seals a space between the cover member 15a of the solid-state image sensor 15 and the optical element 11. The connection terminal 15c of the solid-state image sensor 15 is connected to the circuit board 17. The circuit board 17 is equipped with an electric element having a controlling circuit to control the operation of the camera body 100. The supporting plate 18 is integrated with the solid-state image sensor 15 to fix the solid-state image sensor 15 to the camera body 100 with screws 32 (FIG. 3 and FIG. 4).

The focal plane shutter 50 includes a leading blade 21, a trailing blade 22, an intermediate plate 23, a retainer plate 24, a cover plate 25, a leading blade driving source 27, a charge source 28, and an trailing blade driving source 29. The leading blade 21 includes a plurality of shutter blades 21a to 21d. The trailing blade 22 also includes a plurality of shutter blades. The intermediate plate 23 is configured to separate a driving space of the leading blade 21 and that of the trailing blade 22. The retainer plate 24 is configured to retain the trailing blade 22 and has an opening 24a arranged at a central portion thereof to allow light to pass therethrough for photographing. The cover plate 25 is configured to retain the leading blade 21 and has an opening 25a arranged at a central portion thereof to allow light to pass therethrough for photographing. The leading blade driving source 27 includes an electromagnetic actuator composed of a known coil and yoke, a driving lever, and the like (schematically shown in FIG. 3 for simplicity). The image capture unit 10, including the optical element, is located behind the focal plane shutter 50, including the shutter blades and the cover plate, when viewed from the lens unit. The leading blade driving source 27 is configured to perform an opening operation to bring the leading blade 21 from the status shown in FIG. 2 and FIG. 3 to a status where the opening 24a and the opening 25a are exposed. The charge source 28 includes a driving lever, a spring, and the like, and is configured to perform a closing operation to bring the leading blade 21 that has performed the opening operation back to the closed status shown in FIG. 2 and FIG. 3 (schematically shown in FIG. 3 for simplicity). The trailing blade driving source 29 includes an electromagnetic actuator composed of a known coil and yoke, a driving lever, and the like (schematically shown in FIG. 3 for simplicity). The trailing blade driving source 29 is configured to perform opening and closing operations of the trailing blade 22. In addition, the shutter blades that constitute the leading blade 21 or the trailing blade 22 are driven to integrally perform their opening and closing operations by a single driving lever or a plurality of driving levers (not shown). Furthermore, each shutter blade is formed of a conductive material, or its surface is processed to have conductivity, so as to prevent friction charging during the opening and closing operations.

The conductive member 13 has a connection portion 13a. The connection portion 13a is connected to a ground (GND) portion (not shown) of the circuit board 17 or is connected to the chassis (ground (GND) potential) of the camera body 100 with a screw 31. Accordingly, the conductive member 13 is configured to be grounded. Further, the conductive member 13 is configured to integrally fix the optical element 11 and the supporting member 12 in a status in contact with the surface of the optical element 11.

The cover plate 25 is a conductive member and has a connection portion 25b. The connection portion 25b, similar to the connection portion 13a, is connected to a GND portion (not shown) of the circuit board 17 or is connected to the GND potential portion of the camera body 100 with a screw or the like. Accordingly, the cover plate 25 is also configured to be grounded. Furthermore, the cover plate 25 constitutes the focal plane shutter 50 in a status in contact with the surface of the shutter blade 21a of the leading blade 21. Thus, an electrical potential of at least a surface facing an object side of the optical element is the same as an electrical potential of the shutter blades. In the embodiment described, that potential is grounded. Further, the electrical potential of the shutter blades is made the same as the electrical potential of at least a surface facing the object side of the optical element via a conductive retainer plate that supports the shutter blade.

In addition, the supporting plate 18 has an opening 18b at a central portion thereof and has joint portions 18c for connection with the solid-state image sensor 15. With soldering or the like at the joint portions 18c, the solid-state image sensor 15 and the supporting plate 18 are integrally joined together.

Figure 7:
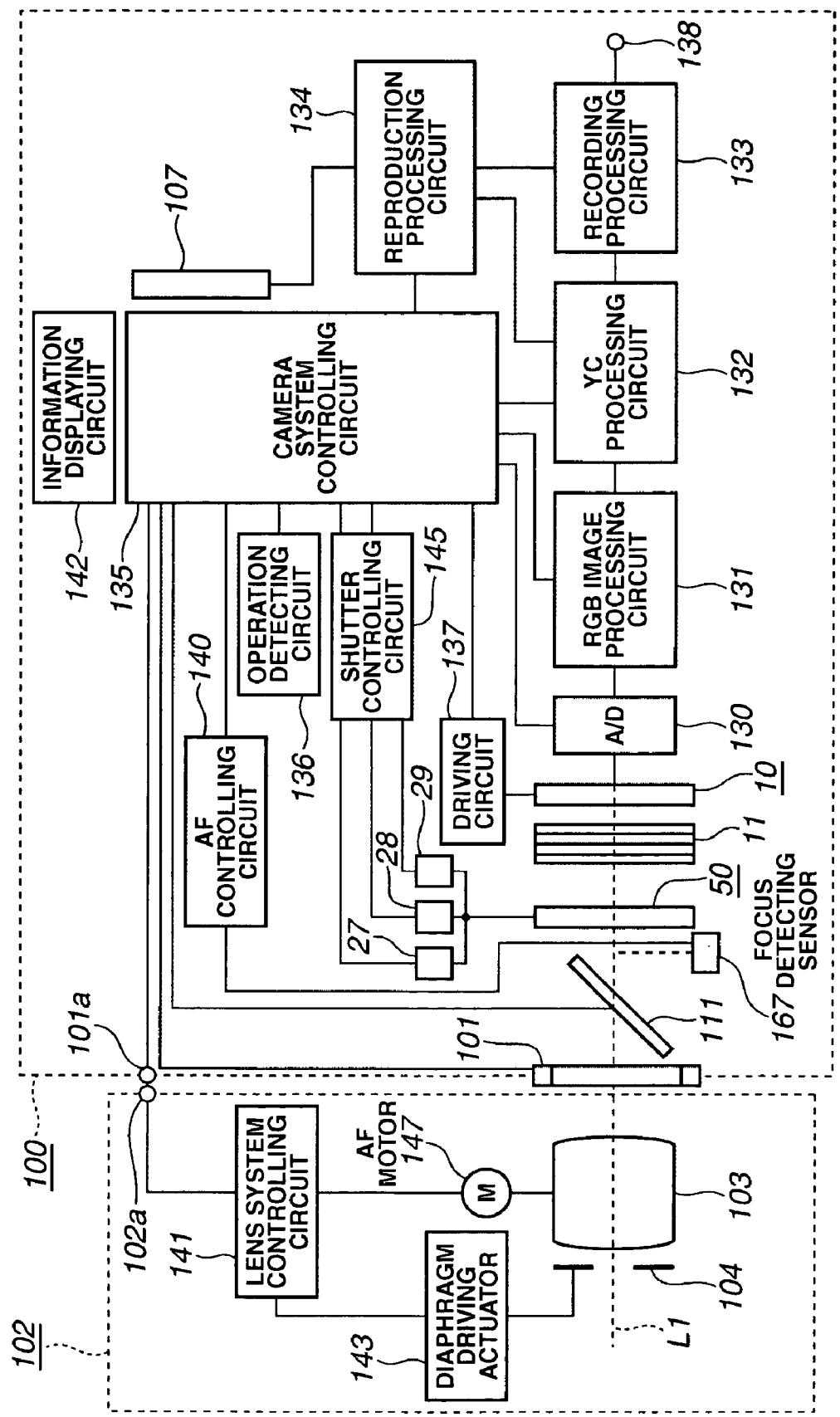
FIG. 7 is a block diagram showing the electrical structure of the camera system according to the first embodiment.

FIG. 7 is a block diagram showing the electrical structure of the camera system according to the first embodiment of the present invention. In FIG. 7, the same or similar members as those shown in FIGS. 1 to 6 are denoted by the same reference numerals as those in FIGS. 1 to 6, and further description thereof is omitted herein. First, units adapted for image capture and recording of an object image are described below.

The camera system is roughly divided into units for performing image capture processing, image processing, recording and reproduction processing, and control processing. The image capture processing unit includes the photographing optical system 103 and the solid-state image sensor 15. The image processing unit includes an A/D converter 130, an RGB image processing circuit 131, and a YC processing circuit 132. The recording and reproduction processing unit includes a recording processing circuit 133 and a reproduction processing circuit 134. The control processing unit includes a camera system controlling circuit 135, an operation detecting circuit 136, and an image sensor driving circuit 137. A connection terminal 138 is connected to an external computer or the like, and is standardized to send and receive data. The above electric circuits are driven by receiving electric power from, for example, a small fuel cell (not shown).

The image capture processing unit performs an optical process to focus light from an object to the imaging plane of the solid-state image sensor 15 via the photographing optical system 103. The image capture processing unit controls the driving of a diaphragm 104 disposed in the lens unit 102 and also drives the focal plane shutter 50 via a shutter controlling circuit 145, so that an appropriate amount of object light can be received by the solid-state image sensor 15.

As the solid-state image sensor 15, an image sensor having approximately 10 million pixels in total is employed, in which 3700 square pixels are arranged in the longer side direction, and 2800 square pixels are arranged in the shorter side direction. Color filters of red (R), green (G) and blue (B) are arranged alternately for respective pixels, and four pixels constitute a pixel set, so that a so-called Bayer array is constructed. In the Bayer array, G pixels, which are felt strongly when an observer views an image, are arranged in larger numbers than R and B pixels, so that the comprehensive image performance can be enhanced. In general, in the image processing using such a type of image sensor, luminance signals are formed mainly from G signals, and chrominance signals are formed from R, G and B signals.

A signal that is read from the solid-state image sensor 15 is supplied to the image processing unit via the A/D converter 130. Image data is formed by the image processing unit. The A/D converter 130 is a signal converting circuit that, according to the amplitude of a signal read from each pixel of the solid-state image sensor 15, converts an output signal from the solid-state image sensor 15 into, for example, a 10-bit digital signal and outputs the digital signal. Image processing thereafter is performed in digital processing. In the image processing unit, in order to acquire image signals of a desired format from R, G and B digital signals, R, G and B color signals are converted into YC signals represented by a luminance signal Y and color-difference signals (R-Y) and (B-Y). The RGB image processing circuit 131 is a signal processing circuit that processes an output signal from the A/D converter 130, and includes a white balance circuit, a gamma correction circuit, and an interpolation calculation circuit that performs a high resolution process by interpolation calculations. The YC processing circuit 132 is a signal processing circuit that forms a luminance signal Y and color-difference signals R-Y and B-Y. The YC processing circuit 132 includes a high-frequency luminance signal generating circuit that generates a high-frequency luminance signal YH, a low-frequency luminance signal generating circuit that generates a low-frequency luminance signal YL, and a color-difference signal generating circuit that generates color-difference signals R-Y and B-Y. The luminance signal Y is formed by combining together the high-frequency luminance signal YH and the low-frequency luminance signal YL.

The recording and reproduction processing unit is a processing circuit that outputs an image signal to a memory (not shown) and outputs an image signal to the display unit 107. The recording processing circuit 133 writes and reads an image signal to and from the memory, and the reproduction processing circuit 134 reproduces an image signal read from the memory and outputs the image signal to the display unit 107. In addition, the recording processing circuit 133 includes a compression/expansion circuit that compresses YC signals representing still image data or moving image data in a predetermined compression format and expands compressed data. The compression/expansion circuit includes a frame memory for signal processing and the like. The compression/expansion circuit accumulates YC signals from the image processing unit into the frame memory on a frame by frame basis, and reads out signals accumulated from each block of a plurality of blocks to compress and encode them. The compression encoding is performed by, for example, two-dimensional orthogonal transformation, normalization and Huffman encoding of image signals for each block.

The reproduction processing circuit 134 is a circuit that matrix-converts a luminance signal Y and color-difference signals R-Y and B-Y to convert them into, for example, RGB signals. The signals converted by the reproduction processing circuit 134 are outputted to the display unit 107, and are then displayed (reproduced) thereon as a visible image. The reproduction processing circuit 134 and the display unit 107 may be connected via wireless communication, such as Bluetooth. In this instance, images captured by the camera system can be monitored at a remote place.

In the control processing unit, the operation detecting circuit 136 detects operations of the main switch 119, the release button 120, the mode change switch 123, and the like (other switches are not shown), and outputs the detection results to the camera system controlling circuit 135. The camera system controlling circuit 135 receives the detection signals from the operation detecting circuit 136 and performs operations according to the detection results. In addition, the camera system controlling circuit 135 generates a timing signal for use in performing an image capture operation and outputs the timing signal to the image sensor driving circuit 137. The image sensor driving circuit 137 receives a control signal from the camera system controlling circuit 135 and, according to the control signal, generates a driving signal for driving the solid-state image sensor 15. An information displaying circuit 142 receives a control signal from the camera system controlling circuit 135 and, according to the control signal, controls the driving of the information display unit 180 in the optical finder.

The control processing unit controls the driving of the image capture processing unit, the image processing unit, and the recording and reproduction processing unit according to the operations of the various switches arranged on the camera body 100. For example, when the full press operation is detected by the operation of the release button 120, the control processing unit (camera system controlling circuit 135) controls the driving of the solid-state image sensor 15, the operation of the RGB image processing circuit 131, the compression processing of the recording processing circuit 133, and so forth. In addition, the control processing unit controls the driving of the information display unit 180 in the optical finder via the information displaying circuit 142 to thereby change a display (condition of a display segment) in the optical finder.

A focus adjusting operation of the photographing optical system 103 is described next.

The camera system controlling circuit 135 is connected to an AF controlling circuit 140. When the lens unit 102 is attached to the camera body 100, the camera system controlling circuit 135 is connected to a lens system controlling circuit 141 in the lens unit 102 via mount contact points 101a and 102a. The AF controlling circuit 140, the lens system controlling circuit 141, and the camera system controlling circuit 135 send and receive data necessary for a predetermined process to one another. A focus detecting unit (focus detecting sensor) 167 outputs a detection signal obtained at a focus detecting area defined at a predetermined position in the image frame to the AF controlling circuit 140. The AF controlling circuit 140 generates a focus detection signal on the basis of the output signal from the focus detecting unit 167 and detects a focus adjusting condition (amount of defocus) of the photographing optical system 103. Then, the AF controlling circuit 140 converts the detected amount of defocus into an amount of driving of a focus lens, which is a part of the photographing optical system 103, and sends information concerning the amount of driving of the focus lens to the lens system controlling circuit 141 via the camera system controlling circuit 135. In this instance, when focus adjustment is performed on a moving object, the AF controlling circuit 140, in consideration of a time lag from the full press operation of the release button 120 to the start of the actual image capture control operation, predicts an appropriate stop position of the focus lens. Then, the AF controlling circuit 140 sends information concerning the amount of driving of the focus lens to the predicted stop position to the lens system controlling circuit 141.

On the other hand, if the camera system controlling circuit 135 determines that the brightness of an object is low and, thus, sufficient focus detection precision cannot be obtained on the basis of the output signal from the solid-state image sensor 15, the flashing unit 114, a white light-emitting diode (LED) (not shown), or a fluorescent tube (not shown) disposed on the camera body 100 is activated to illuminate the object. The lens system controlling circuit 141, when receiving the information concerning the amount of driving of the focus lens from the camera system controlling circuit 135, controls the driving of an AF motor 147 disposed in the lens unit 102, to thereby move the focus lens by the amount of driving in the direction of the optical axis L1 via a driving mechanism (not shown). Accordingly, the photographing optical system 103 is brought into an in-focus state. Incidentally, if the focus lens is constructed from a liquid lens or the like, focusing is performed by changing an interface shape thereof.

In addition, the lens system controlling circuit 141, when receiving information concerning an exposure value (aperture value) from the camera system controlling circuit 135, controls the driving of a diaphragm driving actuator 143 in the lens unit 102 to thereby control the diaphragm 104 so as to attain a diaphragm opening diameter corresponding to the aperture value.

Furthermore, the shutter controlling circuit 145, when receiving information concerning the shutter speed from the camera system controlling circuit 135, controls the driving of the driving sources 27 and 29 and the charge unit 28, which are arranged to drive the leading blade 21 and the trailing blade 22 of the focal plane shutter 50. Thus, the shutter controlling circuit 145 operates the leading blade 21 and the trailing blade 22 so as to attain the above shutter speed. The operations of the focal plane shutter 50 and the diaphragm 104 enable an appropriate amount of object light to be lead to the imaging plane of the solid-state image sensor 15. When it is detected that the object has been focused in the AF controlling circuit 140, this information is sent to the camera system controlling circuit 135. At this moment, if the full press operation of the release button 120 is performed, as described above, a photographing operation is performed by the image capture processing unit, the image processing unit, and the recording and reproduction processing unit.

With the camera system configured as described above, the following effects can be obtained.

Since the cover plate 25 of the focal plane shutter 50 is grounded, the shutter blade 21a, which is in contact with the cover plate 25, and the shutter blades 21b to 21d, which are operative to open and close integrally with the shutter blade 21a via the driving lever (not shown), are approximately grounded. This is because the shutter blades 21a to 21d are formed of a conductive material, or because the surfaces thereof are processed to have conductivity. Accordingly, the surfaces of the shutter blades 21a to 21d as well as the cover plate 25 have the same potential as the GND portion of the circuit board 17 or the GND potential portion of the camera body 100.

Since the shutter blades 21a to 21d have conductivity, even if friction charging or the like occurs when the leading blade 21 opens and closes in response to the operations of the driving source 27 and the charge unit 28 according to the driving signal from the shutter controlling circuit 145, electric charge occurring due to the friction charging flows to the GND portion of the circuit board 17 or the GND potential portion of the camera body 100 via the connection portion 25b of the cover plate 25 because of the conductivity the shutter blades 21a to 21d. Accordingly, during the opening/closing operation of the leading blade 21 and before and after the opening/closing operation, the surfaces of the shutter blades 21a to 21d are approximately at the same potential as the GND portion of the circuit board 17 or the GND potential portion of the camera body 100.

On the other hand, contact charging occurring due to the contact between the supporting member of the main mirror 111 and the stopper portion of the top surface of the mirror box, or friction charging occurring due to the friction of the shutter blades 21a to 21d by the shutter operation, may induce electricity to the optical element 11. In addition, the entire optical element 11 may be charged with electricity due to pyroelectricity of the low-pass filter of the optical element 11. However, in this case also, since the surface of the optical element 11 is also in contact with the conductive member 13, electric charge transmitted to the conductive member 13 flows to the GND portion of the circuit board 17 or the GND potential portion of the camera body 100 via the connection portion 13a in the same manner as described above. Accordingly, the optical element 11 is approximately at the same potential as the GND portion of the circuit board 17 or the GND potential portion of the camera body 100 via the connection portion 13a.

Thus, the surfaces of the shutter blades 21a to 21d and the optical element 11 are approximately at the same potential as the GND portion of the circuit board 17 or the GND potential portion of the camera body 100 via the connection portion 25b of the cover plate 25 and the connection portion 13a of the conductive member 13. Accordingly, since no potential difference occurs between the shutter blades 21a to 21d and the optical element 11, no electric field occurs therebetween. Therefore, even if charged foreign matter enters a space formed between the shutter blades 21a to 21d and the optical element 11, the foreign matter is not attracted to the optical element 11 because no static electricity occurs. Consequently, it is possible to prevent foreign matter from adhering to the surface of the optical element 11.

In the above discussion, the conductive member 13 has been described as being a member having conductivity. However, for example, an insulating material such as plastic or so may be employed in place of the conductive member 13 if a known conductive paint is applied onto the surface thereof so as to have conductivity.

Furthermore, the connection portion 13a and the connection portion 25b have been described as being connected to the GND portion of the circuit board 17 or the GND potential portion of the camera body 100 with the screw 31 or the like. However, the present invention is not limited to this configuration. For example, lead wires may be soldered to the connection portion 13a and the connection portion 25b respectively and they may be connected to the GND portion of the circuit board 17 or the GND potential portion of the camera body 100. Alternatively, in a condition where the connection portion 13a of the conductive member 13 and the connection portion 25b of the cover plate 25 are connected to each other by a lead wire, either the connection portion 13a or the connection portion 25b may be connected to the GND portion of the circuit board 17 or the GND potential portion of the camera body 100.

Furthermore, in the first embodiment, each of the leading blade 21 and the trailing blade 22 of the focal plane shutter 50 has been described as being constructed from a plurality of shutter blades. However, the present invention is not limited to this configuration. For example, even if the leading blade 21 is constructed from a single blade, a similar effect can be obtained.

Furthermore, even if a known diaphragm/shutter device is employed in place of the focal plane shutter 50, the same configuration as that described in the above embodiment may be applied to the diaphragm/shutter device, so that an electric field occurring between the diaphragm/shutter device and the optical element 11 can be considerably reduced. Therefore, a similar effect can be obtained.

FIG. 8 is a diagram showing experimental results of reduced adhesion of dust onto the optical element 11 according to the first embodiment.

In this example of experiment, fine particles (material: polystyrene, average particle diameter: 45 to 63 μm) were sprayed onto the leading blade 21 of the focal plane shutter 50 in advance, and the number of sprayed fine particles was counted. This is the number of fine particles shown in column 901. In this status, after the temperature condition was changed from room temperature to 0° C., the shutter operation was performed, and, then, the number of fine particles adhering to the optical filter of the optical element 11 was counted. This corresponds to the number of fine particles adhering to the optical element 11 after the shutter operation shown in column 902. In FIG. 8, rows 1 to 3 indicate measured values at each time of measurement. Column 903 indicates the rate of the number of adherent fine particles to the number of original fine particles, and column 904 indicates the average adhesion rate thereof.

Row 910 indicates a case where the blades of the focal plane shutter and the optical element are insulated as in the conventional technique. Row 911 indicates a case where the blades of the focal plane shutter and the optical element have conductivity and are grounded as in the first embodiment. Further, row 912 indicates a case where only the optical element 11 has conductivity and is grounded.

As is apparent from this example of experiment, it is understood that, according to the first embodiment, the average adhesion rate of the fine particles has decreased to approximately 20% of that of the conventional case.

Second Embodiment

A camera system according to a second embodiment of the present invention is described next with reference to FIG. 9. In the above-described first embodiment, the potential of the surface of the optical element 11 is made the same as that of the focal plane shutter 50, so that foreign matter can be prevented from adhering onto the surface of the optical element 11. In the case of the second embodiment, however, no optical element 11 is disposed between the focal plane shutter 50 and the solid-state image sensor 15. Except this point, the other structures are the same as those in the above-described first embodiment, and, therefore, further description thereof is omitted herein.

Figure 9:
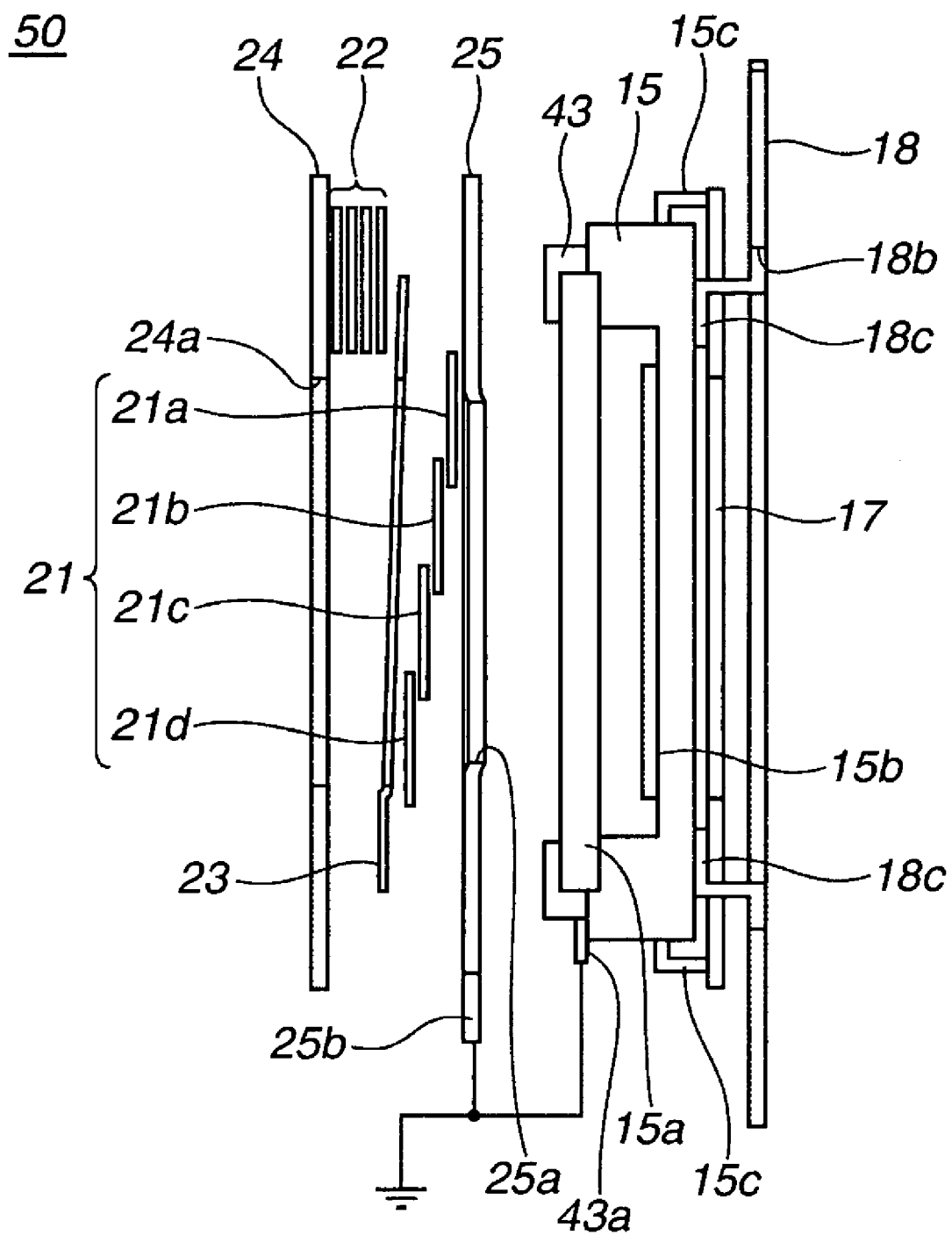
FIG. 9 is a cross sectional side view illustrating the outline structure of an image capture unit and a focal plane shutter of a camera system according to a second embodiment.

FIG. 9 is a cross sectional side view illustrating the outline structure of the image capture unit 10 and the focal plane shutter 50 of the camera body 100 according to the second embodiment. In FIG. 9, the same or similar members as those shown in FIG. 2 are denoted by the same reference numerals as those in FIG. 2, and further description thereof is omitted herein. As shown in FIG. 9, the image sensor 15 is located behind the shutter blades as viewed from a lens unit.

Referring to FIG. 9, a conductive member 43 is made of a conductive material and is integrally fixed to the solid-state image sensor 15 in contact with the surface of the solid-state image sensor 15 at the object side of the solid-state image sensor 15. The conductive member 43 has a connection portion 43a. The connection portion 43a is connected to a GND portion (not shown) of the circuit board 17 or a GND potential portion (not shown) of the camera body 100 with a screw or the like. Accordingly, the conductive member 43 is configured to be grounded. Thus, an electrical potential of at least a surface facing an object side of the image sensor is the same as an electrical potential of the shutter blades. In the embodiment described, that potential is ground. Further, the electrical potential of the shutter blades are made the same as the electrical potential of at least a surface facing the object side of the image sensor via a conductive retainer plate that supports the shutter blade.

With the above-described configuration, the following effects can be obtained.

Similar to the first embodiment, since the cover plate 25 of the focal plane shutter 50 is grounded, the surfaces of the shutter blades 21a to 21d as well as the cover plate 25 have the same potential as the GND portion of the circuit board 17 or the GND potential portion of the camera body 100. Further, the surface of the solid-state image sensor 15 is in contact with the conductive member 43. Accordingly, even if electricity is induced to the solid-state image sensor 15 by contact charging occurring due to the contact between the supporting member of the main mirror 111 and the stopper portion of the top surface of the mirror box, or friction charging occurring due to the friction of the shutter blades 21a to 21d by the shutter operation, electric charge flows to the GND portion of the circuit board 17 or the GND potential portion of the camera body 100 via the connection portion 43a of the conductive member 43. Accordingly, the solid-state image sensor 15 is always at the same potential as the GND portion of the circuit board 17 or the GND potential portion of the camera body 100 via the connection portion 43a.

Thus, the surfaces of the shutter blades 21a to 21d and the solid-state image sensor 15 are at the same potential as the GND potential portion via the connection portion 25b of the cover plate 25 and the connection portion 43a of the conductive member 43. Accordingly, no potential difference occurs between the shutter blades 21a to 21d and the solid-state image sensor 15. Therefore, even if charged foreign matter enters a space formed between the shutter blades 21a to 21d and the solid-state image sensor 15, the foreign matter is not attracted to the solid-state image sensor 15 because no static electricity occurs. Consequently, it is possible to prevent foreign matter from adhering to the surface of the solid-state image sensor 15.

In the above discussion, the conductive member 43 has been described as being a member having conductivity. However, for example, an insulating material such as plastic or so may be employed in place of the conductive member 43 if a known conductive paint is applied onto the surface thereof so as to have conductivity.

Furthermore, the connection portion 43a and the connection portion 25b have been described as being connected to the GND portion of the circuit board 17 or the GND potential portion of the camera body 100 with a screw or the like. However, the present invention is not limited to this configuration. For example, lead wires may be soldered to the connection portion 43a and the connection portion 25b respectively and they may be connected to the GND portion of the circuit board 17 or the GND potential portion of the camera body 100. Alternatively, in a condition where the connection portion 43a of the conductive member 43 and the connection portion 25b of the cover plate 25 are connected to each other by a lead wire, either the connection portion 43a or the connection portion 25b may be connected to the GND portion of the circuit board 17 or the GND potential portion of the camera body 100.

Furthermore, each of the leading blade 21 and the trailing blade 22 of the focal plane shutter 50 has been described as being constructed from a plurality of shutter blades. However, the present invention is not limited to this configuration. For example, even if the leading blade 21 is constructed from a single blade, a similar effect can be obtained.

Furthermore, even if a known diaphragm/shutter device is employed in place of the focal plane shutter 50, the same configuration as that described in the first and second embodiments may be applied to the diaphragm/shutter device, so that an electric field occurring between the diaphragm/shutter device and the solid-state image sensor 15 can be considerably reduced. Therefore, a similar effect can be obtained.

As described above, according to the first and second embodiments, the potential of the blades of the focal plane shutter 50 and the potential of the surface of the optical element 11 or the solid-state image sensor 15 are both at the GND level. Accordingly, the amount of dust and dirt that adhere onto the surface of the optical element 11 or the solid-state image sensor 15 can be greatly reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-297860 filed Oct. 12, 2004, which is hereby incorporated by reference herein in its entirety.

What is claimed is:

1. An image capture apparatus comprising:
a shutter blade having electrical conductivity; and
an optical element located behind the shutter blade as viewed from a lens unit,
wherein an electrical potential of at least an object side surface of the optical element is the same as an electrical potential of the shutter blade, wherein the electrical potential is a ground level potential.

2. The image capture apparatus acccording to claim 1, wherein the optical element is formed integrally with a conductive supporting member that suppoets the optical element.

3. The image capture apparatus according to claim 1, wherein the electrical potential of the shutter blade is made the same as the electrical potential of at least the object side surface of the optical element via a conductive retainer plate that supports the shutter blade.

4. An image capture apparatus comprising:
a shutter blade having electrical conductivity; and
an image sensor located behind the shutter blade as viewed from a lens unit,
wherein an electrical potential of at least an object side surface of the image sensor is the same as an electrical potential of the shutter blade, wherein the electrical potential is a ground level potential.

5. The image capture apparatus according to claim 4, wherein the electrical potential of the shutter blade is made the same as the electrical potential of at least the object side surface of the image sensor via a conductive retainer plate that supports the shutter blade.

* * * * *